United States Patent Office 3,583,977
Patented June 8, 1971

---

3,583,977
HYDROXY AZIRIDINYL COMPOUNDS
Heinz Uelzmann, Cuyahoga Falls, Ohio, assignor to The
General Tire & Rubber Company
No Drawing. Filed June 18, 1968, Ser. No. 737,800
Int. Cl. C07d 23/02, 23/06
U.S. Cl. 260—239                                3 Claims

ABSTRACT OF THE DISCLOSURE

Aziridinyl compounds of the formula:

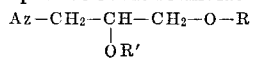

wherein
Az is an aziridino group,
R is hydrogen, or an alkenyl, alkenyl cyclo aliphatic, alkenylaryl, hydroxypolyoxyalkylene, or a hydroxy polyoxyalkylene (oxyalkenyl) group, and
R' is hydrogen, or a hydroxypolyoxyalkylene, or a hydroxy polyoxyalkylene (oxyalkenyl) group
are prepared according to the reaction illustrated by the following typical preparation:

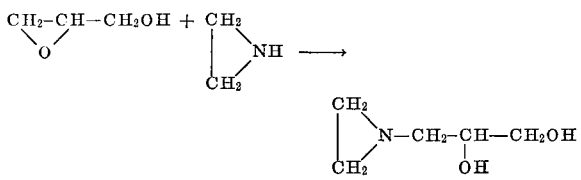

The new compounds can be used in forming adhesives, coatings for fabrics, foams and sponges, binders, emulsifiers and surfactants and as cross-linkers for polymers.

---

BACKGROUND OF THE INVENTION

Ethylenimine is the simplest form of an aziridinyl compound. These products contain one or more aziridinyl group of the general formula:

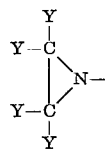

wherein the Y's may be the same or different radicals including hydrogen, alkyl, cycloalkyl, aryl, heterocyclo, etc.

This class of compound has received much attention in the past decade to investigate the reaction of the aziridinyl group with active hydrogen compounds and a host of other reagents. Resulting products have been widely tested for crosslinking reactions, crease-proofing textiles, curing resins, forming polymers and resins and many other purposes.

Varied aziridinyl compounds prepared and investigated in the past have included hydrocarbon derivatives (U.S. 3,231,563), epoxy derivatives (U.S. 3,144,417 and 3,240,-720), carboxyl derivaties (U.S. 3,038,776 and 3,182,040), phosphoric acid derivatives (U.S. 2,606,901), phosphinic acid derivatives (U.S. 3,205,034), urea derivatives (U.S. 3,266,931) and thiophosphoric acid derivatives (U.S. 2,672,459). Tables of these and other aziridinyl compounds are given in U.S. 3,260,702 and 3,115,490.

The present invention relates to yet another class of aziridinyl comypounds, i.e., those containing hydroxyl groups or hydroxyl terminated polyether groups. Broadly, aziridinyl compounds containing hydroxy groups are not new, e.g., see U.S. 3,165,509 which concerns compounds in which two aziridinyl groups are attached to a mono-hydroxy alkyl bridging group. U.S. 3,303,144 discloses a compound having one aziridinyl group and one hydroxy group while U.S. 3,329,674 and 3,369,016 show compounds having two to three aziridinyl groups. New compounds of this invention are distinctive in containing at least one aziridinyl group and at least two hydroxy groups or substituted derivatives thereof, e.g., ether groups, separated by an organic moiety containing at least two carbon atoms.

OBJECTS

A principal object of this invention is the provision of new compounds containing an aziridinyl group and a pair of hydroxyl groups or an hydroxyl group and an ether group joined together by a bridging group containing two carbon atoms.

Further objects include the provision or attainment of the following:

(1) New hydroxy aziridine compounds.
(2) New hydroxy aziridinyl polyether compounds.
(3) New compounds containing both aziridinyl and hydroxy or oxy groups which can be reacted with a variety of organic and inorganic substances to produce new combinations of monomeric and polymeric products.
(4) New aziridinyl compounds which may be reacted with proton-active substances to create modified products including polyether groups which may then be employed in further reactions.
(5) New surfactants from aziridinyl-hydroxy compounds.
(6) New methods for the production of the foregoing novel compounds.

Other objects and further scope of applicability of the present invention will become apparent from the detailed description given hereinafter; it should be understood, however, that the detailed description and specific examples, while indicating preferred embodiments of the invention are given by way of illustration only, since various changes and modifications within the spirit and scope of the invention will become apparent to those skilled in the art from this detailed description.

SUMMARY OF THE INVENTION

These objects are accomplished according to the present invention by the reaction of certain aziridinyl compounds with glycidol or ether derivatives thereof to form compounds of the class represented by the following formula:

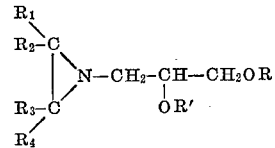

wherein
$R_1$, $R_2$, $R_3$ and $R_4$ are hydrogen or a 1 to 4 carbon atom alkyl group,
R is hydrogen, or an alkenyl, alkenyl cyclo aliphatic, alkenyl aryl, hydroxy polyoxyalkylene, or a hydroxy polyoxy alkylene (oxyalkenyl) group, and
R' is hydrogen, or a hydroxy polyoxyalkeylene, or a hydroxy polyoxyalkylene (oxyalkenyl) group.

A preferred group of the new compounds are those in which the substitutent R contains 2 to 10 carbon atoms.

Other preferred groups are those compounds in which R', $R_1$, $R_2$ and $R_3$ are hydrogen.

Yet another preferred group are those in which R and R' are polyoxypropylene radicals.

Another new type of product provided by the invention are homopolymers of the compounds represented by the foregoing formula.

The new compounds are prepared by reacting a glycidol compound of the formula:

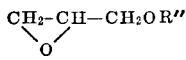
      II where R″ is hydrogen or an alkenyl radical of from 2 to 10 carbon atoms with an aziridinyl compound of the formula:

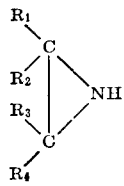
      III wherein $R_1$ to $R_4$ have the meaning as hereinbefore defined.

Another feature of the invention is the preparation of hydroxy terminated polyether aziridines by reacting a compound prepared in accordance with the invention of the formula:

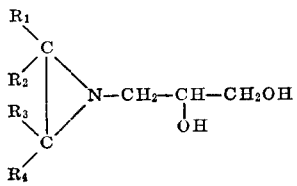
      IV wherein $R_1$ to $R_4$ are as hereinbefore defined, with an alkylene oxide, e.g., ethylene oxide or propylene oxide, allyl glycidyl ether, crotyl glycidyl ether, butylene oxide, vinyl cyclo hexene oxide, or other epoxide or mixture thereof to form hydroxy terminated polyethers with pendant aziridine rings useful for crosslinking carboxyl containing polymers like copolymers of butadiene and acrylic acid or methacrylic acid or for other reactions. For water soluble polymers a large amount of ethylene oxide is used. For water insoluble polymers other epoxides are used. Use of 1–15 mol percent of a monomer like allyl glycidyl ether with propylene oxide will provide aziridinyl ether compounds which can be cured with sulfur, peroxides and other conventional curing or vulcanizing agents. The molecular weight of the polyether can be varied by the amount of epoxide used for chain extension to obtain liquids, oils, greases, resins and rubbers with molecular weights up to 1,000,000 or more.

Still another feature of the invention is the reaction of compounds IV with carboxylic acids to produce new surfactants, particularly emulsifiers, of the formula:

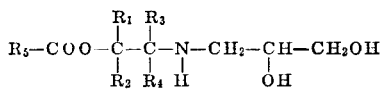
      V wherein $R_1$ to $R_4$ are the same as above and $R_5$ is 5 to 27 carbon atom residue of saturated or unsaturated aliphatic or aromatic carboxylic acids including naphthenic acids. To increase water solubility the surfactant may be reacted further with ethylene oxide whereas to decrease water solubility it may be reacted with propylene oxide or a higher epoxide as discussed herein.

The new compounds I may be reacted with diisocyanates by chain extension to give aziridinopolyurethanes.

Glycidol ethers of the structure

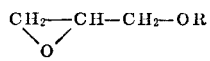

also undergo ring opening with aziridines to yield 1-aziridino-2-hydroxy-3-propyl ethers (VI). The —OH group in such ethers may be reacted with epoxides to obtain polyoxyalkylene groups which may or may not have olefinic groups. These compounds have the general formula

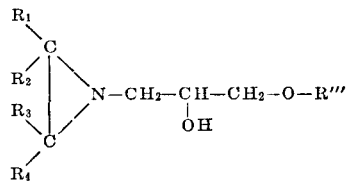
      VI where R‴ is an alkenyl group of from 2 to 10 carbon atoms.

These compounds, (VI) also, may be reacted with the acids shown above to obtain surfactants which in turn can be further reacted with epoxides like ethylene oxide, propylene oxide or other epoxides to increase or decrease their solubility in water, organic solvents and the like. These compounds having olefinic groups can be crosslinked by means of sulfur and/or peroxides or other curing or vulcanizing agents. These compounds containing olefinic groups for example

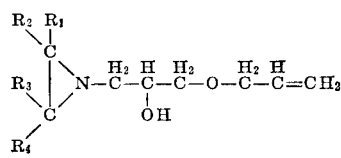

can be homopolymerized or copolymerized using peroxide and other catalysts in emulsion or suspension with vinyl acetate, vinyl chloride, vinylidene chloride or polymerizable mixture thereof to form copolymers containing reactive hydroxyl and aziridinyl groups which can be crosslinked by means of diisocyanates, carboxylic acids and so forth. Alternatively, these copolymers can further be treated with epoxides. Examples of epoxides which can be used for the chain extension and modification of the novel compounds of this invention are disclosed in U.S. Pat. No. 3,278,457.

The reagents II, III and IV as hereinbefore defined should be free of active or activatable halogen, sulfur, and phosphorous atoms which would interfere with the reaction such as those atoms combined in sulfonic acid groups, phosphonic acid groups, mercaptans, alkyl halides, acid halides, sulfonyl halides, phosphonyl halides, etc. They should also be free from acid groups such as carboxylic acid groups.

DESCRIPTION OF PREFERRED EMBODIMENTS

The following details of actual operations in accordance with the invention and reported data illustrate the further principles and practice of the invention to those skilled in the art. In these examples and throughout the remaining specification and claims, all parts and percentages are by weight and all temperatures are in degrees centigrade unless otherwise specified.

EXAMPLE 1

1-(N-butylenimino)-2,3-propanediol 852 parts of butylenimine were heated to 50° C. and then 444 parts of glycidol were added dropwise with stirring. The reaction became exothermic and the temperature was kept below 85° C. by cooling. The addition took 2 hours. The reaction mixture was stirred an additional 5.5 hours at around 40° C. Excess butylenimine was distilled off, up to 90° C. pot temperature at 0.2 mm., and 415 parts were recovered. The reaction product amounted to 867 parts and was distilled in vacuum. The main fraction, 1-(N-butylenimino)-2,3-propanediol, boiled at 95–100° C. and amounted to 657 parts. The residue was polymeric and amounted to 160 parts. Analysis of the aziridinyl diol gave the following results:

Percent nitrogen: Found, 9.71; Calc., 9.60.
Percent aziridine: Found, 27.31; Calc., 28.7

EXAMPLE 2

1-(N-propylenimino)-2,3-propanediol

A mixture of 684 parts of propylenimine and 50 parts of anhydrous $K_2CO_3$ was heated to 40° C. and 444 parts of glycidol were added dropwise with the temperature at 50–55°. After addition was completed (2.25 hours), stirring was continued for another 2 hours at 50–55° C. Excess propylenimine was recovered by distillation in vacuum and amounted to 314 parts.

The crude reaction product amounting to 750 parts was distilled and the main fraction, 1-(N-propylenimino)-2,3-propane diol, boiled at 94° C., 0.4 mm. and amounted to 575 parts. The residue of 133 parts was polymeric. Analysis of the aziridinyl diol gave the following results:

Percent nitrogen: Found, 10.1; Calc., 10.3
Percent aziridine: Found, 29.7; Calc., 31.8

EXAMPLE 3

1-(N-ethylenimino)-2,3-propanediol

Over a period of 2 hours, 920 parts of glycidol were added dropwise to a dispersion of 100 parts of anhydrous $K_2CO_3$ in 1072 parts of ethylenimine at 40° C. After stirring an additional 4 hours at 40° C., the $K_2CO_3$ was filtered off and the filtrate distilled in vacuum.

The forerun consisted of excess ethylenimine. The main fraction, 1-(N-ethylenimino)-2,3-propanediol, boiled at 115°, 1.5 mm. and amounted to 172 parts. The residue was polymeric and amounted to 650 parts. Analysis of the aziridinyl diol gave the following results:

Percent nitrogen: Found, 10.72; calc., 12.0

EXAMPLE 4

1-(N-ethylenimino)-2-hydroxy-3-allyloxy propane

A mixture of 344 parts ethylenimine and 50 parts of anhydrous $K_2CO_3$ was heated to 55° C., and, over a period of 40 minutes, 456 parts of allyl glycidyl ether were added. The temperature rose to 65/70° C. After stirring for another 2.5 hours at 65° C., the reaction mixture was cooled, filtered from the $K_2CO_3$ and distilled. The forerun consisted of excess ethylenimine.

The main product, the 1-(N-ethylenimino)-2-hydroxy-3-allyloxy propane, boiled at 70/75° C., 1.3 mm., and amounted to 420 parts. It was redistilled and the fraction boiling at 70/72° C., 1 mm., amounted to 392 parts. Analysis of the 1-(N-ethylenimino)-2-hydroxy-3-allyloxy propane gave the following results:

Percent nitrogen: Found, 8.94; Calc., 8.90
Percent aziridine: Found, 26.00; calc., 26.60

EXAMPLE 5

1-(N-propylenimino)-2-hydroxy-3-allyloxypropane 456 parts of propylenimine were heated to reflux temperature and 456 parts of allyl glycidyl ether were added through a dropping funnel over a period of 1.5 hours while the temperature rose to 72° C. The reaction mixture was then refluxed for 3.5 hours during which time the temperature went to 84° C.

Distillation in vacuum gave excess propylenimine as forerun, and the main fraction, the 1-(N-propylenimino)-2-hydroxy-3-allyloxypropane, boiled at 75/77° C., 1.2 mm. and amounted to 578 parts. Analysis of the 1-(N-propylenimino)-2-hydroxy-3-allyloxy propane give the following results:

Percent nitrogen: Found, 7.96; calc., 8.20
Percent aziridine: Found, 23.93; calc., 24.50

EXAMPLE 6

1-(N-butylenimino)-2-hydroxy-3-allyloxypropane 568 parts of butylenimine were heated to reflux and 456 parts of allyl glycidyl ether were added over a period of one hour. The temperature rose from 86° C. to 92° C. The reaction mixture was stirred and heated for another 2.75 hours while the temperature went to 114° C., and the reaction mixture was kept at this temperature for another 3.5 hours. Distillation in vacuum gave excess butylenimine as forerun.

The main fraction, the 1-(N-butylenimino)-2-hydroxy-3-allyloxypropane, boiled at 85° C., 0.05 mm., and the yield was 607 parts. Analysis of the 1-(N-butylenimino)-2-hydroxy-3-allyloxypropane gave the following results:

Percent nitrogen: Found, 7.06; calc., 7.52
Percent aziridine: Found, 22.20; calc., 22.50

DISCUSSION OF DETAILS

The aziridinyl compound (reagent III) and epoxy compound (reagent II) may be, in many cases, obtained commercially although they can be prepared using known procedures, particularly the more highly substituted high molecular weight compounds. Advantageously, the reagents may be freshly purified such as by distillation immediately prior to use in carrying out the reactions as herein described in order to remove additives or impurities which might be present in the products.

Representative examples of aziridinyl compounds of the structure of reagent III as hereinbefore defined include:

ethylenimine,
2-methyl aziridine,
2-ethyl aziridine,
2,2,3,3-tetramethyl aziridine,
2-butyl aziridine,
2-methyl-3-propyl aziridine,
2-methyl-3-butyl aziridine,
2,2-dimethyl-3-ethyl aziridine and
2,2-diethyl aziridine and the like and mixtures thereof.

The chemical structure of the aziridinyl reagent employed in the reactions effects the chemical reactivity and physical properties of resulting products. Unsubstituted ethylenimine generally creates final products of greatest reactivity. Substitution, particularly with alkyl groups of higher molecular weight, creates final products of lesser chemical activity, and resulting polymeric products made from them are softer.

The products of the invention are also influenced by the structure of the epoxy compound selected from those having the structural formula of reagent II as hereinbefore defined. The preferred compound for use as reagent II is glycidol, but in place of glycidol one can use a compound having the formula

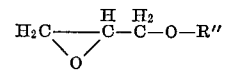

where R″ is an alkenyl, alkenyl cycloaliphatic or alkenyl aryl radical having from 2 to 10 carbon atoms. Examples of such compounds are:

vinyl glycidyl ether,
allyl glycidyl ether,
methallyl glycidyl ether,
crotyl glycidyl ether,
vinyl cyclohexyl glycidyl ether,
o-allyl phenyl glycidyl ethyl,
p-vinyl-benzyl glycidyl ether and the like and mixtures thereof.

Determination of chemical composition of products resulting from practice of the invention can be obtained by analysis of reaction products for nitrogen content, aziridine content and other atom or molecular group content according to established analytical procedures. Aziridine content is a particularly useful technique and known method for such analysis involves opening of the aziridine ring as reported in J.A.C.S. 77, 5918 (1955).

In carrying out the reactions as described hereinbefore for the production of the new hydroxy aziridinyl compounds, the reaction conditions may be varied and will depend to some extent on the exact reagents used in preparing the desired products. Temperatures between about 5 and 160° C. are usable although temperatures between 30–120° C. are advantageously used with the majority of reagents. Proportions of the reagents may also be varied, e.g., a ratio of from about 4 to 2 mols of aziridinyl reagents for each mol of glycidol or equivalent reagent and especially such a ratio of about 2:1. Excess aziridine is desired to cause the reaction to go forward to completion and to obtain good yields of the hydroxy aziridine compounds. The reactions may be conducted using a solvent or diluent that is unreactive to the reagents. Preferably, the reaction media contains an effective amount of anhydrous $K_2CO_3$ or $Na_2CO_3$, etc. to avoid the formation of by-products such as by avoiding polymerization through the aziridine ring and thereby to increase yields.

Recovery of the desired product from the reaction mixture may be performed in any suitable manner, e.g., solvent extraction, distillation, vacuum distillation, adsorption, chromatographic separation, etc.

With the use of the specific reagents hereinbefore described, a multitude of new aziridinyl compounds within the scope of the invention may be formed. Examples of some of the new compounds include:

1-(N-butylenimino)-2,3-propanediol,
1-(N-propylenimino)-2,3-propanediol,
1-(N-ethylenimino)-2,3-propanediol,
1-(N-ethylenimino)-2-hydroxy-3-allyloxy propane,
1-(N-propylenimino)-2-hydroxy-3-allyloxy propane,
1-(N-butylenimino)-2-hydroxy-3-allyloxy propane,
1-(N-butylenimino)-2-hydroxy-3-crotyl propane,
1-(N-ethylenimino)-2-hydroxy-3-vinylcyclohexyloxy propane,
the ethylene oxide adduct of 1-(N-ethylenimino)-2,3-propane diol,
1-(2,2,3,3-tetramethyl aziridinyl)-2,3-propanediol,
the ethylene oxide-propylene oxide adduct of 1-(N-propylenimino)-2,3-propanediol,
the propylene oxide-allyl glycidyl ether adduct of 1-(N-butylenimino)-2,3-propanediol,
the butylene oxide adduct of 1-(N-ethylenimino)-2-hydroxy-3-allyloxy propane, and
the ethylene oxide adduct of 1-(N-ethylenimino)-2-hydroxy-3-crotyl propane.

As to the acid derivatives of the new compounds, examples of some of the surfactants include:

2-(N-2,3-dihydroxy propylamino) ethyl stearate,
1-methyl-2-(N-2-hydroxyl-3-allyloxy propylamino) ethyl palmitate,
2-(N-2,3-dihydroxy propylamino) ethyl oleate,
1,2-diethyl-2-(N-2,3-dihydroxy propylamino) ethyl linoleate,
1,2-dimethyl-2-(N-2,3-dihydroxy propylamino) ethyl myristate,
the ethylene oxide adduct of 2-(N-2,3-dihydroxy propylamino) ethyl stearate,
the ethylene oxide-propylene oxide adduct of 2-(N-2,3-dihydroxy propylamino) ethyl phenyl acetate, and
the propylene oxide adduct of 1-propyl-2-(N-2-hydroxyl-3-vinyl oxy propylamino) ethyl laurate.

In the new hydroxy aziridinyl compounds, the pendant aziridinyl groups may be made to react with organic acids and polymers containg —COOH groups to form aminoethylene groups. The mechanism is reported in J. Org. Chem. 9, 500 (1944). The aziridinyl group can react with epoxides to form hydroxy ethylene or alkylene groups (see U.S. 2,475,068) and with hydroxy groups, e.g., as present in polyols, epoxy resins, etc., to form aminoethoxy groups (see J.A.C.S. 77, 5116 (1955)). There is, accordingly, in such polymer reactions possible multiplication of functional groups using the new compounds rendering these materials usable in crosslinking and chain-ending reactions. Combinations of crosslinking and chain-ending in controlled proportions and degrees in polymers is also possible using mixtures of the new compounds, e.g., propellants.

Monomeric or polymeric carboxylic acids, anhydrides, acid chlorides, mercaptans, sulfonic acids, sulfonyl chlorides, phosphonic acids, or their corresponding acid halides, mercaptans, epoxy compounds, epoxy resins, amines, hydrazines, amides, hydrazides, hydrogen sulfide, and other functional groups which react with the pendant aziridine group, can be modified or cross-linked with the new aziridinyl compounds. Polymers without functional groups can also be blended into these compositions as well as plasticizers, elastomers and the like. The new compounds can be used as chain terminators or cross-linkers for —COOH containing polymers such as carboxylated polybutadienes, butadiene-styrene-acrylic acid copolymers, carboxyl terminated polyureas and urethanes, etc. In such reactions, the resulting polymers acquire hydroxy groups, with the properties associated with such groups.

The new products of the invention as hereinbefore defined compounds I may be obtained as monomeric compounds. They may be homopolymerized or mixtures of them may be copolymerized to give polymers of the type in which the simplest of the series would be represented by the formula:

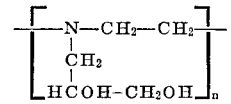

where $n=5$ to 5000 or more

In producing such polymers, one may use catalysts such as $BF_3$, dimethyl sulfate, mineral acids, etc., advantageously in conjunction with elevated temperatures, e.g., 20–150° C. These polymers can be cross-linked with polyisocyanates or chain extended with ethylene oxide or other epoxides to give rubbers, resins, (polyurethane) foams, protective coatings, propellant binders, etc.

The dihydroxy containing aziridines of this invention can be used as chain extenders for isocyanate terminated polyurethane prepolymers, such as polyether and/or ester urethane prepolymers, to give polyurethanes with pendant aziridine groups. These polyurethanes can then be cross-linked by acid catalysts, heat, di-acid chlorides, dicarboxylic acids, di-mercaptans, and di-sulfonyl chlorides to give rubbers or resins. Likewise, the alkylene oxide extended dihydroxy containing aziridines can be reacted with diisocyanates or can be used to chain extend diisocyanate terminated polyurethane prepolymers and subsequently crosslinked as described herein to give rubbery and resinous products. These polyurethanes can be used to make industrial V-belts, sponge or foam (rigid or flexible), gaskets, oil seals, industrial mounts, coated fabrics and so forth.

Reaction of the new hydroxy aziridinyl compounds with fatty acids of 6 to 28 carbon atoms leads to new surfactants, e.g., non-ionic emulsifiers or dispersing agents. As emulsifiers they can be used in emulsion copolymerization of vinyl chloride and vinyl acetate. As dispersants, they can be used for dispersing mineral and vegetable oils. Examples of acids that can be used in such surfactant production include caproic, caprylic, capic, lauric, myristic, palmitic, stearic, arachidic, behenic, hypogaeic, cerotic, pelargonic, margaric, nondecylic, sorbic, palmitoleic, oleic, ricinoleic, petroselinic, linoleic, linolenic, benzoic, eleo-stearic, licanic, erucic, chaulmoogric, para aminobenzoic, cyclopentane-carboxylic, cyclopentyl acetic, 3-methyl cyclopentyl acetic, camphonanic, 4-methyl cyclohexane carboxylic, 2,2,6-trimethyl cyclohexane carbox-

United States Patent Office 3,584,008
Patented June 8, 1971

---

3,584,008
PHOSPHORAMIDATES OF CYCLIC AMIDINES
Derek Redmore, St. Louis, Mo., assignor to Petrolite Corporation, Wilmington, Del.
No Drawing. Filed Sept. 5, 1967, Ser. No. 665,288
Int. Cl. C07d 49/34
U.S. Cl. 260—309.6
5 Claims

ABSTRACT OF THE DISCLOSURE

Amides of cyclic amidines and phosphoric acids including both oxygen, sulfur, and oxygen-sulfur-containing phosphoric acids, as illustrated by amides of the formula $$\left[\textcircled{A}\left[-A-\overset{H}{\underset{|}{N}}-\right]_p\right]_n\overset{X}{\underset{\|}{P}}(XR')_{3-n}$$

where Ⓐ is a cyclic amidine-containing radical, for example imidazoline and tetrahydropyridine, X is oxygen and/or sulfur; R' is hydrogen or an alcohol moiety; A is alkylene, n is 1–3 and p is 0–10. These compounds, among other uses are employed as corrosion inhibitors.

---

This invention relates to amides of cyclic amidines and phosphoric acids. More particularly this invention relates to amides of the formula $$[\textcircled{A}[-A-NH-]_p]_n\overset{X}{\underset{\|}{P}}(XR')_{3-n}$$

where Ⓐ is a cyclic amidine containing radical, for example imidazoline, and tetrahydropyrimidine; X is oxygen and/or sulfur; R' is hydrogen or an alcohol moiety; A is alkylene; n is 1–3; and p is 0–10. This invention also relates to uses for these amides, including their use as corrosion inhibitors.

More specifically, in the above formula Ⓐ contains either imidazoline or tetrahydropyrimidine radicals, for example, the following radicals (1)
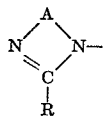

(2)
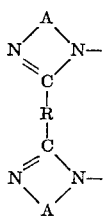

in which

and

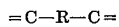

are the residual radicals derived from the carboxylic acids:

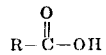

or

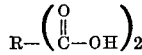

where R comprises, for example, a saturated or unsaturated aliphatic radical, a cycloaliphatic radical, an aryl radical, an aralkyl radical, an alkaryl radical, an alkoxy-alkyl radical, an aryloxyalkyl radical, and the like; and A is an alkylene group; for example, ethylene and propylene radicals, such as

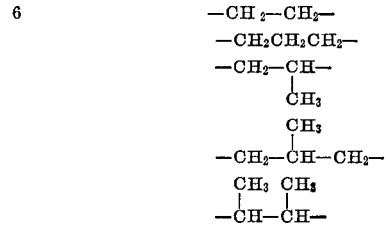

In general the cyclic amidine phosphoramidates are prepared by reacting phosphorylating reagents such as phosphoric acids and thiophosphoric acids and derivatives of these such as anhydrides, partial anhydrides and halides, with the desired molar ratio of amino containing cyclic amidines for example of the formula

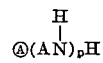

where p is 0–10. The products are characterized by having at least one P–N bond.

More specifically, the corrosion inhibiting aspect of this invention relates to a method for inhibiting corrosion of ferrous metals by hydrocarbon fluids containing water and corrosive materials such as $H_2S$, $CO_2$, inorganic acids, organic acids, etc., combinations of these materials with each other, combinations of each of said corrosive materials with oxygen, and combinations of said materials with each other and oxygen, which comprises adding to said fluids at least five parts per million of the above cyclic amidine phosphoramidates, said compounds being sufficiently soluble in the hydrocarbon fluid to inhibit corrosion.

THE CYCLIC AMIDINE PRECURSOR

The expression "cyclic amidines" is employed in its usual sense to indicate ring compounds in which there are present either 5 members or 6 members, and having 2 nitrogen atoms separated by a single carbon atom supplemented by either two additional carbon atoms or three additional carbon atoms completing the ring. All the carbon atoms may be substituted. The nitrogen atom of the ring involving two monovalent linkages (the 1-position) is substituted with an amino-containing group capable of reacting with the phosphate precursor to form the amides of this invention. This amino containing side group may be represented by $-(XNR')_nH$ wherein X is alkylene and R' is hydrogen or alkyl, but preferably hydrogen, and n is a whole number, for example, 0–10 or higher, but preferably 0–3.

These cyclic amidines are further characterized as being imidazolines and tetrahydropyrimidines unsubstituted in 1-position or substituted in the 1-position with alkylene-amino or polyalkylene-amino group in which the two-position carbon of the ring is generally bonded to a hydrocarbon radical or comparable radical derived from an acid, such as a low molal fatty acid, a high molal fatty acid, or comparable acids, polycarboxy acids, and the like.

For details of the preparation of imidazolines substituted in the 2-position from amines, see the following U.S. Pats. No. 1,999,989, dated Apr. 30, 1935, Max Bockmuhl et al.; No. 2,155,877, dated Apr. 25, 1939, Edmund Waldmann et al.; and No. 2,155,878, dated Apr. 25, 1939, Edmund Waldmann et al. Also see Chem. Rev. 32, 47 (1943) and Chem. Rev. 54, 593 (1954).

Equally suitable for use in preparing compounds of my invention and for the preparation of tetrahydropyrimidines substituted in the 2-position are the polyamines con-